3,322,755
BASIC-SUBSTITUTED 1,2,3,4-TETRAHYDROPY-
RIMIDO[5,4-d]-PYRIMIDINES
Josef Roch and Heinz Scheffler, Biberach an der Riss,
Germany, assignors to Boehringer Ingelheim G.m.b.H.,
Ingelheim am Rhine, Germany, a corporation of Germany
No Drawing. Filed Mar. 10, 1964, Ser. No. 350,688
8 Claims. (Cl. 260—246)

This invention relates to basic-substituted pyrimido-[5,4-d]-pyrimidines and to a novel process for the preparation of these compounds.

More particularly, the present invention relates to novel basic-substituted pyrimido-[5,4-d]-pyrimidines of the formula

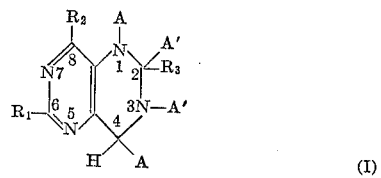

wherein A and A' are each hydrogen, $R_1$ and $R_3$ are hydrogen, halogen, free or substituted amino, a nitrogen atom which is a ring member of an unsubstituted or substituted heterocycle, free or substituted hydrazino, free or substituted guanidino, alkyl, aryl, aralkyl, substituted alkyl, substituted aryl, substituted aralkyl, or free or substituted hydroxyl, and $R_2$ is free or substituted amino, a nitrogen atom which is a ring member of an unsubstituted or substituted heterocycle, free or substituted hydrazino, free or substituted guanidino, alkyl, aryl, aralkyl, substituted alkyl, substituted aryl, substituted aralkyl, or free or substituted hydroxyl, provided, however, that at least one of $R_1$, $R_2$ and $R_3$ is a basic substituent, that is, free or substituted amino, a nitrogen atom which is a ring member of an unsubstituted or substituted heterocycle, free or substituted hydrazino or free or substituted guanidino, and that only one of $R_1$ and $R_3$ may be halogen, and their pharmacologically acceptable acid addition salts.

The present invention also relates to a novel process for the preparation of compounds of the Formula I above wherein A and A' are each hydrogen or together form a double bond. Pyrimido-[5,4-d]-pyrimidines of the Formula I wherein each A forms a double bond with the adjacent A' are disclosed in U.S. Patent No. 3,031,450.

The novel process according to the present invention comprises subjecting a tetra-substituted pyrimido-[5,4-d]-pyrimidine of the formula

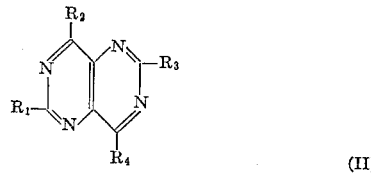

wherein $R_1$, $R_2$ and $R_3$ have the same meanings as in Formula I and $R_4$ is free or substituted amino, a nitrogen atom which is a ring member of an unsubstituted or substituted heterocycle, free or substituted hydrazino, free or substituted guanidino, free or substituted hydroxyl, or free or substituted mercapto, provided, however, that $R_4$ must be a member of the above group other than hydroxyl if $R_1$ and $R_3$ are both other than basic substituents, that is, other than free or substituted amino, a nitrogen atom which is a ring member of an unsubstituted or substituted heterocycle, free or substituted hydrazino or free or substituted guanidino, to reduction to form a tetrahydro-pyrimido-[5,4-d]-pyrimidine of the Formula I wherein A and A' each are hydrogen, treating said tetrahydro-pyrimido-[5,4-d]-pyrimidine with an oxidizing agent to form the corresponding aromatic pyrimido-[5,4-d]-pyrimidine of the Formula I wherein each A together with its adjacent A' represents a double bond, and optionally converting the basic aromatic compounds into acid addition salts.

The term "substituted amino," as used above in connection with the definition of $R_1$, $R_2$, $R_3$ and $R_4$, includes mono- as well as di-substituted amino, the substituent or substituents being preferably alkyl, alkoxyalkyl, alkenyl, cycloalkyl, hydroxyalkyl, dialkylaminoalkyl, haloalkyl, carboxyalkyl, aryl or aralkyl radicals.

The term "a nitrogen atom which is a ring member of an unsubstituted or substituted heterocycle" refers to basic saturated or unsaturated heterocycles comprising 2 to 6 carbon atoms in the ring, such as morpholino, piperidino, tetrahydro-pyridino, pyrrolidino, piperazino or the like, each of which may optionally have a substituent attached to one or more of the ring atoms; alkyl, aryl, aralkyl, alkoxy or hydroxyl radicals or halogen atoms are preferred as ring substituents.

The terms "substituted hydrazino" and "substituted guanidino" refer to hydrazino and guanidino radicals wherein one or both of the nitrogen atoms have one or more further substituents attached thereto; alkyl, aralkyl or aryl radicals being preferred as such N-substituents.

The term "substituted hydroxyl" refers preferably to alkoxy, aryloxy, aralkoxy, alkoxy-alkoxy or dialkyl-amino-alkoxy radicals.

Finally, the term "substituted mercapto," as used in the definition of $R_4$, preferably refers to alkyl-, aryl-, aralkyl- or carboxyalkyl-mercapto radicals.

The reduction of the tetra-substituted pyrimido-[5,4-d]-pyrimidine (II) by means of nascent or catalytically activated hydrogen or by electrolysis has proved to be particularly advantageous. The reduction is performed in the presence of an inert solvent, especially an inert polar solvent, and especially advantageously in weakly acid solution, preferably at a pH of about 2 to 5, because the solubility of most of the starting compounds (II) is only slight at a weaker acid pH of about 6 and the reduction reaction generally proceeds only slowly, while at a stronger acid pH than about 1 the yield of the tetrahydro-compound in most instances decreases substantially. In order to accelerate the reduction reaction, it may in some cases be advantageous to carry it out at elevated temperatures.

The tetra-substituted pyrimido-[5,4-d]-pyrimidines of the Formula II, which are used as starting materials for the reduction reaction described above, may themselves be prepared by the method described in U.S. Patent No. 3,031,450, that is, by simultaneous or stepwise exchange of halogen atoms or other reactive substituents for the radicals defined under $R_1$, $R_2$, $R_3$ and $R_4$ above.

The tetrahydro-pyrimido-[5,4-d]-pyrimidines embraced by formula I above have not previously been described.

On the other hand, the aromatic pyrimido-[5,4-d]-pyrimidines, that is, those wherein each A and its adjacent A form a double bond, are known compounds and may be prepared by the methods described in U.S. Patent No. 3,031,450 and German Patent No. 1,093,801, that is, by replacement of halogen in correspondingly halogenated aromatic pyrimido-[5,4-d]-pyrimidines or by ring closure, starting from correspondingly substituted pyrimidine-carboxylic acid-(4) derivatives.

We have surprisingly discovered that the tetrahydro-pyrimido-[5,4-d]-pyrimidines of the Formula I as well as their aromatic analogs may be prepared in very simple fashion, with a high degree of purity and very good yields by reductive degradation of the corresponding 4- and/or 8-substituted pyrimido-[5,4-d]-pyrimidines.

Such a strictly selective replacement of individual substituents, such as those defined under $R_4$ above, by hydrogen has previously not been known neither in connection with pyrimido-[5,4-d]-pyrimidines not in connection with similar poly-substituted ring systems. The smooth course of reaction in the process according to the present invention could also not have been expected in any way. For instance, the reduction of 2,6-bis-(diethanolamino)-4,8 - dipiperidino - pyrimido - [5,4-d] - pyrimidine with zinc dust in dilute acetic acid and subsequent oxidation of the resulting tetrahydro-pyrimido-[5,4-d]-pyrimidine produces 2,6 - bis - (diethanolamino) - 8-piperidino - pyrimido-[5,4-d]-pyrimidine with a 95% yield and extraordinarily high degree of purity.

Equally surprising is the fact that in the process according to the present invention only one of the substituents in the 4- or 8-position, as defined under $R_4$ in Formula II, is replaced by hydrogen, while on the other hand even a halogen atom in the 2- or 6-position is not reductively removed. Since, in the ring system of the pyrimido-[5,4-d]-pyrimidine, the 4-position is identical to the 8-position, there is a possibility in the case of asymmetrically-substituted starting compounds that the end product may occur in the form of two, possibly isomeric compounds, depending upon whether the substituent in the 4- or 8-position has been removed by reduction.

The 1,2,3,4 - tetrahydro - pyrimido - [5,4 - d] - pyrimidines of the Formula I may readily be transformed into the corresponding aromatic pyrimido-[5,4-d]-pyrimidines, especially in alkaline solution. In order to recover the tetrahydro-compounds it is advantageous to work under exclusion of air during the isolation step because they easily oxidize into the aromatic compounds in the presence of oxygen in the air.

However, if it is desired to isolate the aromatic compounds directly, it is advantageous to add a customary oxidizing agent to the reduction reaction mixture.

The acid addition salts of the basic-substituted tetrahydro-pyrimido-[5,4-d]-pyrimidines of the Formula I are substantially more resistant against oxidation than the free bases.

The following examples will further illustrate the present invention and enable others skilled in the art to understand our invention more completely. It should be understood, however, that the invention is not limited to the particular examples given below.

EXAMPLE 1

3.9 gm. (0.06 mol) of zinc powder were introduced into a solution of 5.0 gm. (0.01 mol) of 2,6-bis-(diethanolamino) - 4,8 - dipiperidino - pyrimido - [5,4-d] - pyrimidine in 120 cc. of aqueous 10% formic acid. The resulting mixture was heated on a water bath, while occasionally stirring, until the intense yellow color of the starting compound disappeared, which occurred after about 30 to 40 minutes. Thereafter, the unconsumed zinc powder was separated by vacuum filtration; the virtually colorless filtrate was essentially an aqueous solution of 2,6-bis-(diethanolamino) - 8 - piperidino - 1,2,3,4 - tetrahydropyrimido-[5,4-d]-pyrimidine of the formula

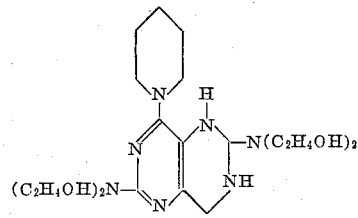

The filtrate was adjusted to a pH of 9 by adding concentrated ammonia, and then a 1 N aqueous iodine-potassium iodide solution was added dropwise, whereby the tetrahydro-pyrimido-[5,4-d]-pyrimidine obtained by hydrogenation was converted by oxidation into 2,6-bis-(diethanolamino) - 8 - piperidino - pyrimido - [5,4-d] - pyrimidine. The completion of the oxidation was checked by means of a starch solution. The major amount of the oxidation product already separated out as a deep yellow crystalline precipitate during the addition of the iodine solution. After the oxidation reaction was complete, the reaction mixture was allowed to stand for a short period of time, and then the precipitate was separated by vacuum filtration, washed with water and dried. It had a melting point of 157–158° C. The yield was 8.0 gm., which corresponds to 95% of theory.

The same compound was obtained when acetic acid, lactic acid, tartaric acid, succinic acid, fumaric acid, sorbic acid or sulfosalicylic acid were used instead of formic acid in the reduction step with zinc powder described above. The yields of 2,6-bis-(diethanolamino)-8-piperidino-pyrimido-[5,4-d]-pyrimidine ranged from 50 to 90% of theory.

EXAMPLE 2

(a) 2.0 gm. (0.03 mol) of zinc powder were added to a solution of 2.5 gm. (0.005 mol) of 2,6-bis-(diethanolamino)-4,8-dipiperidino-pyrimido-[5,4-d] - pyrimidine in 100 cc. of 0.1 N hydrochloric acid, and the mixture was heated for about one hour on a steam bath. During that time, 2 N hydrochloric acid was continuously added dropwise in order to maintain a pH value of 2 to 4 in the reaction mixture. After termination of the reduction the excess zinc powder was separated by vacuum filtration. The filtrate was essentially an acid aqueous solution of 2,6-bis-(diethanolamino)-8-piperidino-1,2,3,4 - tetrahydropyrimido-[5,4-d]-pyrimidine. The filtrate was made slightly alkaline by adding about 15 cc. of concentrated ammonia, and then a solution of 1.4 gm. of iodine in methanol was added dropwise to oxidize the tetrahydro-compound into 2,6-bis-(diethanolamino)-8-piperidino-pyrimido-[5,4-d]-pyrimidine. The reaction mixture was then worked up as described in Example 1. 1.5 gm. (71% of theory) of 2,6-bis-(diethanolamino)-8-piperidinopyrimido-[5,4-d]-pyrimidine were obtained.

(b) 2.5 gm. (0.005 mol) of 2,6-bis-(diethanolamino)-4,8-dipiperidino-pyrimido-[5,4-d]-pyrimidine were dissolved in 100 cc. of about 1 N hydrochloric acid, and the resulting solution was buffered to a pH of 2 to 4 by addition of 7.5 gm. of sodium acetate. 2.0 gm. (0.03 mol) of zinc powder were then added, and the mixture was heated for about 30 minutes on a steam bath. Toward the end of this period a small amount of 2 N hydrochloric acid had to be added dropwise to maintain a pH of 2 to 4. The excess zinc powder was filtered off, and the filtrate was again found to be an acid aqueous solution of 2,6-bis-(diethanolamino) - 8 - piperidino - 1,2,3,4-tetrahydro-pyrimido-[5,4-d]-pyrimidine. The filtrate was made alkaline by adding about 15 cc. of ammonia, and then an aqueous 1 N sodium nitrite solution was added dropwise to oxidize the tetrahydro-compound. After the oxidation was complete the reaction mixture was worked up as described in Example 1. 1.9 gm. (90% of theory) of 2,6-bis-(diethanolamino)-8-piperidino-pyrimido - [5,4-d]-pyrimidine were obtained.

Analogous results were obtained when 1 N sulfuric acid was used in place of 1 N hydrochloric acid in the reduction step with zinc powder in the procedures described under (a) and (b) above.

EXAMPLE 3

5.0 gm. (0.01 mol) of 2,6-bis-(diethanolamino)-4,8-dipiperidino-pyrimido-[5,4-d]-pyrimidine were dissolved in 120 cc. of aqueous 10% acetic acid, and the solution was reduced with zinc powder as described in Example 1. After removing the excess zinc powder the virtually colorless solution was neutralized with concentrated ammonia and was allowed to stand for a little while, whereupon 2, 6-bis-(diethanolamino)-8-piperidino-1,2,3,4 - tetrahydropyrimido-[5,4-d]-pyrimidine precipitated out. The tetrahydro-compound was partially contaminated with the analogous aromatic compound, that is, with 2,6-bis-(diethanolamino)-8-piperidino-pyrimido-[5,4 - d] - pyrimidine. For this reason the precipitate was again hydrogenated in about 500 cc. of ethanol with hydrogen and Raney nickel as a catalyst at room temperature and atmospheric pressure. Thereafter, the reaction solution was worked up under exclusion of air (nitrogen atmosphere). After removal of the catalyst, the ethanol solution was evaporated in vacuo and the reaction product isolated thereby was digested with a small amount of water, vacuum filtered and dried in an exsiccator. 2.9 gm. (68% of theory) of a pale yellow microcrystalline powder were obtained, which had a melting point of 148–151° C. It was identified to be 2,6-bis-(diethanolamino)-8-piperidino-1,2,3,4-tetrahydro-pyrimido-[5,4-d]-pyrimidine.

The same compound was obtained when the above-described procedure was repeated, but 2,6-bis-(diethanolamino)-4-ethylmercapto-8-piperidino-pyrimido - [5,4-d]-pyrimidine was used as the starting material instead of 2,6-bis-(diethanolamino)-4,8-dipiperidino-pyrimido - [5, 4-d]-pyrimidine.

EXAMPLE 4

(a) 2.5 gm. (0.005 mol) of 2,6-dimorpholino-4,8-di-(β-propoxy-ethoxy)-pyrimido-[5,4 - d] - pyrimidine were dissolved in 100 cc. of aqueous 35% acetic acid, 2.0 gm. of zinc powder were added thereto, and the mixture was heated on a steam bath. Thereafter, the unconsumed zinc powder was filtered off. The filtrate was essentially an acid aqueous solution of 2,6-dimorpholino-8-(β-propoxy-ethoxy)-1,2,3,4-tetrahydro-pyrimido-[5,4-d] - pyrimidine of the formula

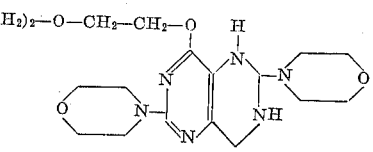

The filtrate was made alkaline to a pH of about 9 with concentrated ammonia, and then a sufficient amount of an aqueous 1 N iodine-potassium iodide solution was added to oxidize the tetrahydro-pyrimido-pyrimidine compound in solution into 2,6-dimrophoIino-8-(β-propoxy-ethoxy)-pyrimido-[5,4-d]-pyrimidine. The completion of the oxidation was checked with starch solution. The orange colored precipitate which formed immediately was separated by vacuum filtration, washed and dried. 1.5 gm. (74% of theory) of 2,6-dimorpholino-8-(β-propoxy-ethoxy)-pyrimido-[5,4-d]-pyrimidine were obtained. After reprecipitation from 0.1 N hydrochloric acid and recrystallization from methanol the oxidation product had a melting point of 141–142° C.

(b) Using a procedure analogous to that described under (a) above, but substituting 2 N acetic acid for the aqueous 35% acetic acid, 1.2 gm. (75% of theory) of 2,6-dimorpholino-8-hydroxy-pyrimido-[5,4-d] - pyrimidine were obtained, starting from 1.7 gm. (0.005 mol) of 2,6-dimorpholino-4,8-dihydroxy - pyrimido - [5,4-d]-pyrimidine and passing through 2,6-dimorpholino-8-hydroxy-1,2,3,4-tetrahydro-pyrimido-[5,4-d] - pyrimidine as an intermediate. For purification, the end product was recrystallized from dimethyl-formamide; it has no melting point up to above 300° C.

The same end product was obtained by the same method starting from 2,4,6-trimorpholino-8-hydroxy-pyrimido-[5,4-d]-pyrimidine. The intermediate hyrogenation product was also 2,6-dimorpholino-8-hydroxy-1,2,3,4-tetrahydro-pyrimido-[5,4-d]-pyrimidine.

EXAMPLE 5

2.0 gm. (0.005 mol) of 2,6-dimorpholino-4-ethoxy-8-(β - hydroxyethyl - amino) - pyrimido - [5,4 - d] - pyrimidine were dissolved in 100 cc. of aqueous 20% acetic acid, 2.0 gm. of zinc powder were added and the mixture was heated on a steam bath. The excess zinc was filtered off. The filtrate was found to be an acid aqueous solution of 2,6 - dimorpholino - 8 - (β - hydroxyethyl - amino) - 1,2,-3,4-tetrahydro-pyrimido-[5,4-d]-pyridimine of the formula

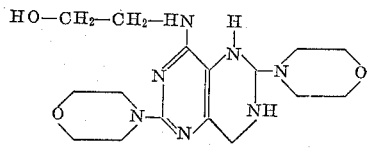

The filtrate was then made alkaline with concentrated ammonia and a 1 N aqueous iodine-potassium iodide solution was added, as described in Example 4(a), to oxidize the tetrahydro-compound in solution. 1.2 gm. (65% of theory) of 2,6 - dimorpholino - 8 - (β - hydroxyethyl - amino)-pyrimido-[5,4-d]-pyrimidine were obtained. Recrystallized from a mixture of ethanol and dioxane (5:1), the oxidation product had a melting point of 225–228° C.

EXAMPLE 6

4.4 gm. (0.01 mol) of 2-diethanolamino-6-chloro-4,8-dipiperidino-pyrimido-[5,4-d]-pyrimidine were dissolved in 100 cc. of aqueous 60% acetic acid, 3.9 gm. of zinc powder were added, and the mixture was heated on a water bath. Thereafter, the excess zinc powder was filtered off. The filtrate was found to be an acid aqueous solution of 2 - diethanolamino - 6 - chloro - 8 - piperidino - 1,2,3,4-tetrahydro-pyrimido-[5,4-d]-pyrimidine of the formula

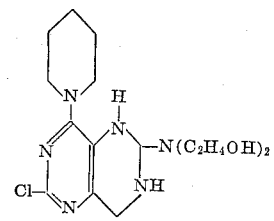

The filtrate was made alkaline with concentrated ammonia and an aqueous 1 N iodine-potassium iodide solution was added, as described in Example 4(a), to oxidize the tetrahydro-compound in solution. 2.3 gm. (65% of theory) of 2-diethanolamino-6-chloro-8-piperidino-pyrimido-[5,4-d] pyrimidine were obtained. After recrystallizing the oxidation product twice from methanol, it had a melting point of 169–171° C.

EXAMPLE 7

(a) 3.8 gm. (0.01 mol) of 2-morpholino-4,8-dipiperidino-pyrimido-[5,4-d]-pyrimidine were dissolved in 200 cc. of aqueous 20% acetic acid, 3.9 gm. of zinc powder were added and the mixture was heated on a steam bath as described in Example 1. Subsequently, the unconsumed zinc powder was filtered off. The filtrate was identified to be an acid aqueous solution of the mixture of the isomeric 2 - morpholino - 8 - piperidino - 1,2,3,4 - tetrahydro - pyrimido-[5,3-d]-pyrimidine and 6-morpholino-8-piperidino-1,2,3,4-tetrahydro-pyrimido [5,4-d]-pyrimidine of the formulas

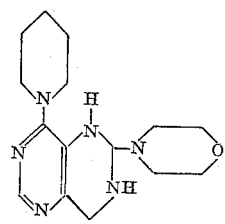

and

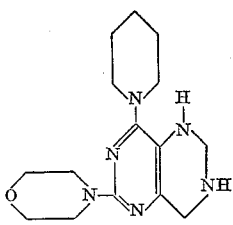

The filtrate was adjusted to a pH of about 9 with concentrated ammonia, and then a 1 N aqueous iodine-potassium iodide solution was added dropwise to oxidize the tetrahydro-compounds in solution, also as described in Example 1. Initially, a mixture consisting of 2-morpholino - 8 - piperidino-pyrimido - [5,4-d]-pyrimidine and 6-morpholino - 8 - piperidino-pyrimido-[5,4-d]-pyrimidine was obtained. The yield was 1.7 gm. (57% of theory). The mixture was recrystallized twice from methanol, whereby the isomers were separated and a chromatographically uniform substance was isolated. The 2-morpholino-8(4) - piperidino-pyrimido - [5,4-d] - pyrimidine thus obtained melted at 145 to 147° C.

(b) Using a procedure analogous to that described under (a) above, an isomeric mixture consisting of 6,8-dimorpholino-pyrimido - [5,4-d] - pyrimidine and 2,8-dimorpholino - pyrimido - [5,4-d] - pyrimidine was obtained from 2,4,8 - trimorpholino - pyrimido - [5,4-d]-pyrimidine by passing through the intermediate tetrahydro-compounds 6,8-dimorpholino - 1,2,3,4-tetrahydropyrimido - [5,4-d] - pyrimidine and 2,8-dimorpholino-1,2,3,4-tetrahydro-pyrimido - [5,4-d] - pyrimidine of the formulas

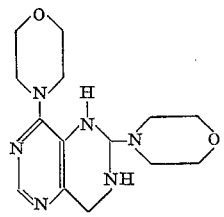

and

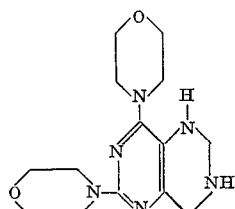

EXAMPLE 8

(a) 3.9 gm. (0.01 mol) of 2,4,6-tripiperidino-8-aminopyrimido - [5,4-d] - pyrimidine were dissolved in 100 cc. of aqueous 40% acetic acid, zinc powder was added and the mixture was heated on a steam bath. The excess zinc powder was filtered off, yielding a filtrate which was essentially an acid aqueous solution of 2,6-dipiperidino-8-amino - 1,2,3,4-pyrimido - [5,4-d] - pyrimidine of the formula

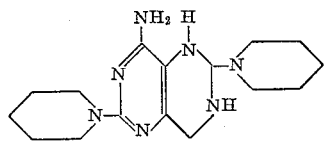

The filtrate was then made alkaline with concentrated ammonia and oxidized with a 1 N iodine-potassium iodide solution as described in Example 1. 90% of theory of 2,6 - dipiperidino - 8 - amino-pyrimido - [5,4-d]-pyrimidine were obtained. Recrystallized from dioxane, the oxidation product had a melting point of 245 to 247° C.

(b) Using a procedure analogous to that described in Example 1, 2.4 gm. (0.005 mol) of 2-diethanol-amino-4,6,8 - tripiperidino-pyrimido - [5,4-d] - pyrimidine were reduced in 60 cc. of aqueous 25% acetic acid by means of zinc powder, yieding 2-diethanol-amino - 6,8(4)-dipiperidino - 1,2,3,4-tetrahydro-pyrimido - [5,4-d] - pyrimidine of the formula

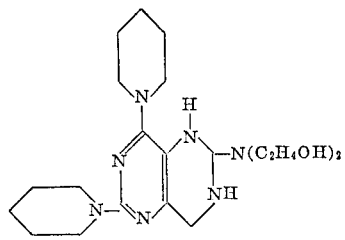

which was then oxidized in alkaline solution with a 1 N aqueous iodine-potassium iodide solution. The initially pasty oxidation product was separated and was crystallized by dissolving it in a small amount of methanol and adding a small amount of water to the methanol solution. 1.1 gm. (55% of theory) of 2-diethanol-amino-6,8(4)-dipiperidino-pyrimido-[5,4-d]-pyrimidine were obtained. Recrystallized from a mixture of methanol and water (3:1), the oxidation product had a melting point of 112 to 114° C.

EXAMPLE 9

A spatula tipful of platinum oxide was hydrogenated in about 50 cc. of 0.05 N hydrochloric acid at room temperature and atmospheric pressure accompanied by shaking, and after addition of 0.5 gm. (0.001 mol) of 2,6-bis-(diethanolamino) - 4,8 - dipiperidino-pyrimido-[5,4-d]-pyrimidine, the hydrogenation was continued until the absorption of the calculated amount of hydrogen was complete. The subsequent treatment of the reaction solution and the isolation of the hydrogenation product was effected under exclusion of air (nitrogen atmosphere) as follows: After separation of the catalyst by vacuum filtration, the colorless filtrate was evaporated in vacuo, and the residue was digested with warm acetone, vacuum filtered and dried in an exsiccator. 0.2 gm. (43% of theory) of the hydrochloride of 2,6-bis-(diethanolamino)-8-piperidino - 1,2,3,4 - tetrahydro-pyrimido-[5,4-d]-pyrimidine of the formula

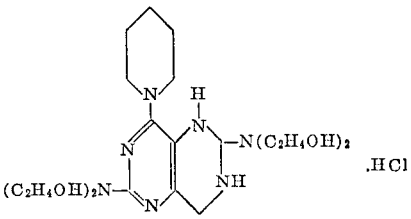

were obtained. The product had a melting point of 166 to 172° C.

EXAMPLE 10

A spatula tipful of platinum oxide was hydrogenated in 100 cc. of aqueous 5% acetic acid at 80° C. and atmospheric pressure accompanied by shaking. After introduction of 0.9 gm. (0.002 mol) of 2,6-dimorpholino-4,8-bis-(methylethanolamino) - pyrimido-[5,4-d]-pyrimidine the hydrogenation was continued under the same conditions until the absorption of calculated amount of hydrogen was complete. The catalyst was filtered off and the almost colorless filtrate was concentrated in vacuo to about one-half its original volume. The concentrated solution was adjusted to a pH of about 9 by addition of concentrated ammonia. The solution thus obtained represented essentially an alkaline aqueous solution of 2,6-dimorpholine-8- methylethanolamino - 1,2,3,4 - tetrahydro - pyrimido-[5,4-d]-pyrimidine of the formula

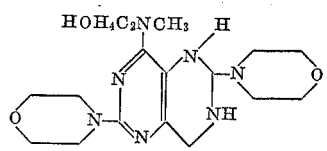

A 1 N iodine-potassium iodide solution was immediately added dropwise to oxidize the tetrahydro-compound. After vacuum filtration, washing and drying of the filter cake, 49% of theory of 2,6-dimorpholino-8-methylethanolamino - pyrimido-[5,4-d]-pyrimidine were obtained. Recrystallized from methanol, the product had a melting point of 185 to 187° C.

EXAMPLE 11

50 gm. (about 0.1 mol) of 2,6-bis-(diethanolamino)-4,8 - dipiperidino - pyrimido - [5,4-d]-pyrimidine were dissolved in 650 cc. of 0.5 N sulfuric acid, and the solution was electrolyzed on a platinum cathode at a current density of about 0.5 ampere/cm.$^2$ and a temperature of 33 to 37° C. for about 50 ampere-hours. The anode compartment was supplied with 0.5 N sulfuric acid. The liquid loss in the cathode compartment was replenished from time to time with 0.5 N sulfuric acid. The completion of the hydrogenation by electrolysis was recognized by a substantial loss of color of the previously intensely yellow solution as well as by an intensified evolution of gas at the cathode. The solution in the cathode compartment was found to be essentially an acid aqueous solution of 2,6-bis-(diethanolamino) - 8-piperidino-1,2,3,4-tetrahydropyrimido-[5,4-d]-pyrimidine. The solution in the cathode compartment was then made strongly alkaline with ammonia and was allowed to stand over a period of 14 days in contact with air. The faintly orange-yellow crystalline precipitate formed during that time was separated by vacum filtration, washed with water and dried in vacuo. 17.6 gm. (42% of theory) of 2,6 - bis-(diethanolamino)-8-piperidino-pyrimido-[5,4-d]-pyrimidine contaminated with a very small amount of the analogous tetrahydro-compound were obtained. The end product was identical with that obtained in Example 1.

EXAMPLE 12

(a) 25 gm. (about 0.05 mol) of 2,6-bis-(diethanolamino) - 4,8 - dipiperidino-pyrimido - [5,4-d]-pyrimidine were dissolved in 300 cc. of aqueous 30% acetic acid, and, in order to increase the conductivity of the solution, 100 cc. of an aqueous 30% ammonium sulfate solution were added. The solution mixture thus obtained was then electrolyzed on a platinum cathode at a current density of about 0.50 ampere/cm.$^2$ and a temperature of 35–38° C. for about 80 ampere-hours. The anode compartment was supplied with an aqueous acetic acid/ammonium sulfate solution analogous to that of the cathode solution, except that it did not contain the pyrimido-[5,4-d]-pyrimidine compound. At the end of the reduction by electrolysis, practically no 2,6-bis-(diethanolamino)-4,8-dipiperidino-pyrimido-[5,4-d]-pyrimidine and only a very small amount of 2,6-bis-(diethanolamino)-8-piperidino-pyrimido[5,4-d]-pyrimidine could be detected in the cathode solution by thin layer chromatography. In other words, the cathode solution consisted essentially of an acid aqueous solution of 2,6-bis-(diethanolamino)-8-piperidino-1,2,3,4-tetrahydro-pyrimido-[5,4-d]-pyrimidine. The cathode solution was now concentrated to about one-third its volume by evaporation in vacuo, and the concentrated solution was made strongly alkaline with ammonia. The alkaline solution was allowed to stand overnight under exclusion of air at room temperature, during which time a pale yellow crystalline precipitate separated out. This precipitate was rapidly vacuum filtered, washed with water and dried in vacuo over calcium chloride. 17.8 gm. (84% of theory) of 2,6-bis-(diethanolamino)-8-piperidino-1,2, 3,4-tetrahydro pyrimido-[5,4-d]-pyrimidine having a melting point of 150–153° C. were obtained. The product was identical to that obtained in Example 3.

(b) 25 gm. of 2,6-bis-(diethanolamino)-4,8-dipiperidino-pyrimido-[5,4-d]-pyrimidine were reduced by electrolysis as described under (a) above. The alkaline cathode solution was admixed with a 1 N aqueous iodine-potassium iodide solution until a postive iodine starch reaction was obtained. An orange-yellow crystalline precipitate formed thereby. The mixture was allowed to stand overnight and was then vacuum filtered, and the filter cake was washed with water and dried at 100° C. 18.4 gm. (88% of theory) of 2,6 - bis - (diethanolamino)-8-piperidino-pyrimido-[5,4-d]-pyrimidine were obtained.

EXAMPLE 13

21.8 gm. (about 0.05 mol) of 2-diethanolamino-6-chloro-4,8-dipiperidino-pyrimido-[5,4-d]-pyrimidine were dissolved in 500 cc. of aqueous 50% acetic acid and, in order to increase the conductivity of the solution, 150 cc. of aqueous 10% sulfuric acid were added. Thereafter, the mixture was electrolyzed on a platinum electrode at a current density of about 0.25 to 0.3 ampere/cm.$^2$ and a temperature of 35–40° C. for about 150 ampere-hours. The anode compartment was supplied with an acetic acid/sulfuric acid solution analogous to that of the cathode solution, except that it did not contain the pyrimido-[5,4-d]-pyrimidine compound.

After completion of the electrolysis the cathode solution was evaporated in vacuo to about one-third its volume, and the concentrated solution was made strongly alkaline with ammonia. The yellowish crystalline precipitate formed thereby was allowed to stand overnight and was then separated by vacuum filtration, washed with water until free from electrolyte and dried in vacuo over calcium chloride. 13 gm. (73% of theory) of 2-diethanolamino - 6 - chloro - 8-piperidino-1,2,3,4-tetrahydro-pyrimido-[5,4-d]-pyrimidine were obtained. Recrystallized from a mixture of methanol and water (1:1), it had a melting point of 149–150° C.

The product thus obtained contained only a very small amount of the analogous aromatic pyrimido-[5,4-d]-pyrimidine compound. By shortening the period of electrolysis and reducing the current density, or by iodine oxidation of the cathode solution, it was possible to obtain the analogous non-hydrogenated compound, that is, 2-diethanolamino - 6-chloro-8-piperidino-pyrimido-[5,4-d]-pyrimidine with a yield of about 74% of theory; it was identical to the end product obtained in Example 6.

EXAMPLE 14

Using a procedure analogous to that described in Example 6, 2,6,8 - tripiperidino-pyrimido - [5,4-d] - pyrimidine, melting point 113–116° C., was prepared by way of the intermediate 2,6,8-tripiperidino-1,2,3,4-tetrahydro-pyrimido-[5,4-d]-pyrimidine of the formula

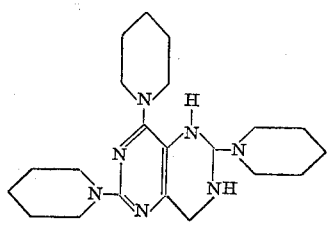

from 2,4,6,8-tetrapiperidino-pyrimido-[5,4-d]-pyrimidine.

EXAMPLE 15

Using a procedure analogous to that described in Example 3, 2,6,8 - tripiperidino-1,2,3,4-tetrahydro-pyrimido-[5,4-d]-pyrimidine, melting point 112–120° C., shown in Example 14, was prepared from 2,4,6,8-tetrapiperidino-pyrimido-[5,4-d]-pyrimidine.

EXAMPLE 16

Using a procedure analogous to that described in Example 6, 2,6,8 - trimorpholino-pyrimido-[5,4-d]-pyrimidine, melting point 175–176° C., was prepared by way of the intermediate 2,6,8-trimorpholino-1,2,3,4-tetrahydro-pyrimido-[5,4-d]-pyrimidine of the formula

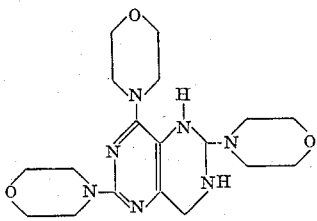

from 2,4,6,8 - tetramorpholino-pyrimido-[5,4-d]-pyrimidine.

EXAMPLE 17

Using a procedure analogous to that described in Example 9, 2,6,8-trimorpholino-1,2,3,4-tetrahydro-pyrimido-[5,4-d]-pyrimidine hydrochloride, melting point 255–258° C. (decomposition), was prepared from 2,4,6,8-tetramorpholino-pyrimido-[5,4-d]-pyrimidine.

EXAMPLE 18

Using a procedure analogous to that described in Example 1 except that 50% acetic acid was used instead of 10% formic acid, 2,6,8-triamino-pyrimido-[5,4-d]-pyrimidine, melting point above 300° C., was prepared by way of the intermediate 2,6,8-triamino-1,2,3,4-tetrahydro-pyrimido-[5,4-d]-pyrimidine of the formula

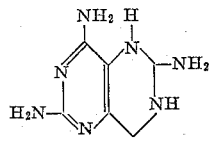

from 2,4,6,8-tetra-amino-pyrimido-[5,4-d]-pyrimidine.

EXAMPLE 19

Using a procedure analogous to that described in Example 9, 2,6,8 - triamino-1,2,3,4-tetrahydro-pyrimido-[5,4-d]-pyrimidine hydrochloride, melting point above 300° C., was prepared from 2,4,6,8-tetra-amino-pyrimido-[5,4-d]-pyrimidine.

EXAMPLE 20

Using a procedure analogous to that described in Example 1, except that 20% acetic acid was used instead of 10% formic acid, 2,6,8-tri-(methylamino)-pyrimido-[5,4-d]-pyrimidine, melting point 183–185°C., was prepared by way of the intermediate 2,6,8-tri-(methylamino)-1,2,3,4-tetrahydro-pyrimido-[5,4-d]-pyrimidine of the formula

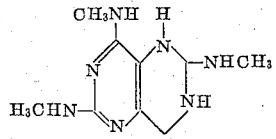

from 2,4,6,8 - tetra-(methylamino)-pyrimido-[5,4-d]-pyrimidine.

EXAMPLE 21

Using a procedure analogous to that described in Example 9, 2,6,8-tri-(methylamino)-1,2,3,5-tetrahydro-pyrimido-[5,4-d]-pyrimidine hydrochloride, melting point 275–282° C. (decomposition), was prepared from 2,4,6,8-tetra-(methylamino)-pyrimido-[5,4-d]-pyrimidine.

EXAMPLE 22

Using a procedure analogous to that described in Example 1, 2,6-dimorpholino-8-(methylethanolamino)-pyrimido-[5,4-d]-pyrimidine, melting point 185–187° C., was prepared by way of the intermediate 2,6-dimorpholino - 8-(methylethanolamino)-1,2,3,4-tetrahydro-pyrimido-[5,4-d]-pyrimidine of the formula

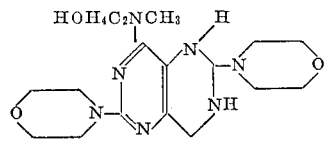

from 2,6-dimorpholino-4,8-bis-(methylethanolamino)-pyrimido-[5,4-d]-pyrimidine.

EXAMPLE 23

Using a procedure analogous to that described in Example 2 (a), 2,6,8-tri-(β-hydroxyethyl-amino)-pyrimido-[5,4-d]-pyrimidine, melting point 202–204° C., was prepared by way of the intermediate 2,6,8-tri-(β-hydroxyethyl - amino) - 1,2,3,4 - tetrahydro - pyrimido-[5,4-d]-pyrimidine of the formula

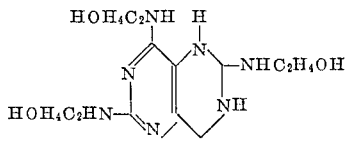

from 2,4,6,8 - tetra-(β-hydroxyethyl-amino)-pyrimido-[5,4-d]-pyrimidine.

EXAMPLE 24

Using a procedure analogous to that described in Example 1, 2,6 - bis-(diethanolamino)-8-allylamino-pyrimido-[5,4-d]-pyrimidine, melting point 139–141° C., was prepared by way of the intermediate 2,6-bis-(diethanolamino) - 8 - allylamino - 1,2,3,4-tetrahydro-pyrimido-[5, 4-d]-pyrimidine of the formula

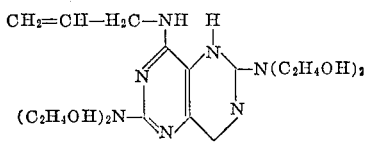

from 2,6 - bis - (diethanolamino)-4,8-bis-(allylamino)-pyrimido-[5,4-d]-pyrimidine.

EXAMPLE 25

Using a procedure analogous to that described in Example 1, except that 20% acetic acid was used instead of 10% formic acid, 2,6-bis-(diisopropanol-amino)-8-morpholino-pyrimido-[5,4-d]-pyrimidine, melting point 184–186° C., was prepared by way of the intermediate 2,6-bis-(diisopropanol-amino) - 8 - morpholino - 1,2,3,4-tetrahydro-pyrimido-[5,4-d]-pyrimidine of the formula

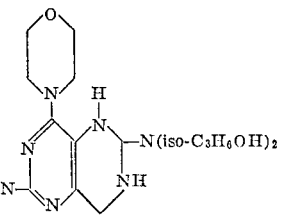

from 2,6 - bis - (diisopropanolamino) - 4,8-dimorpholino-pyrimido-[5,4-d]-pyrimidine.

EXAMPLE 26

Using a procedure analogous to that described in Example 9, 2,6-bis-(diisopropanolamino)-8-morpholino-1,2,3,4-tetrahydro-pyrimido - [5,4-d] - pyrimidine hydrochloride, melting point 102–110° C., was prepared from 2,6-bis - (diisopropanolamino) - 4,8-dimorpholino-pyrimido-[5,4-d]-pyrimidine.

EXAMPLE 27

Using a procedure analogous to that described in Example 1, except that glacial acetic acid was used instead of 10% formic acid, 2,6,8 - trianilino-pyrimido-[5,4-d]-pyrimidine, melting point 282–284° C., was prepared by way of the intermediate 2,6,8-trianilino-1,2,3,4-tetrahydropyrimido-[5,4-d]-pyrimidine of the formula

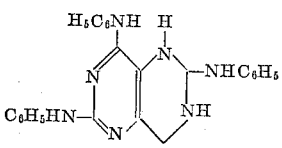

from 2,4,6,8-tetra-anilino-pyrimido-[5,4-d]-pyrimidine.

EXAMPLE 28

Using a procedure analogous to that described in Example 1, except that glacial acetic acid was used instead of 10% formic acid, 2,6,8-tris-(1',2',5',6'-tetrahydropyridino)-pyrimido-[5,4-d]-pyrimidine, melting point 88–90° C., was prepared by way of the intermediate 2,6,8 - tris - (1',2',5',6' - tetrahydro-pyridino) - 1,2,3,4-tetrahydro-pyrimido-[5,4-d]-pyrimidine of the formula

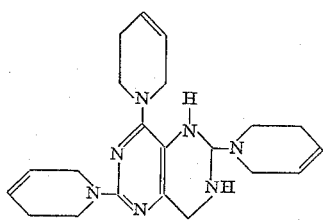

from 24,6,8-tetra-(1',2',5',6'-tetrahydropyridino)-pyrimido-[5,4-d]-pyrimidine.

EXAMPLE 29

Using a procedure analogous to that described in Example 1, except that 50% acetic acid was used instead of 10% formic acid, 2,6,8-tri-(allylamino)-pyrimido-[5,4-d]-pyrimidine, melting point 136–138° C., was prepared by way of the intermediate 2,6,8-tri-(allylamino)-1,2,3,4-tetrahydro-pyrimido-[5,4-d]-pyrimidine of the formula

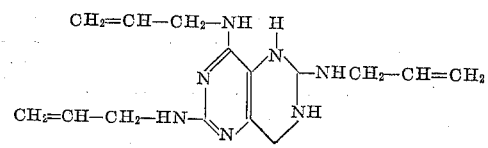

from 2,4,6,8-tetra-(allylamino)-pyrimido-[5,4-d]-pyrimidine.

EXAMPLE 30

Using a procedure analogous to that described in Example 1, except that 50% acetic acid was used instead of 10% formic acid, 2,6-di-(methylamino)-8-anilino-pyrimido-[5,4-d]-pyrimidine, melting point 254–257° C., was prepared by way of the intermediate 2,6-di-(methylamino) - 8 - anilino - 1,2,3,4 - tetrahydro - pyrimido-[5,4-d]-pyrimidine of the formula

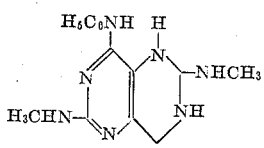

from 2,6 - di - (methylamino) - 4,8 - dianilino - pyrimido-[5,4-d]-pyrimidine.

EXAMPLE 31

Using a procedure analogous to that described in Example 1, 2,6 - di - (methylethanolamino) - 8 - piperidino-pyrimido-[5,4-d]-pyrimidine, melting point 126–128° C., was prepared by way of the intermediate 2,6-di-(methylethanolamino) - 8 - piperidino - 1,2,3,4 - tetrahydro - pyrimido-[5,4-d]-pyrimidine of the formula

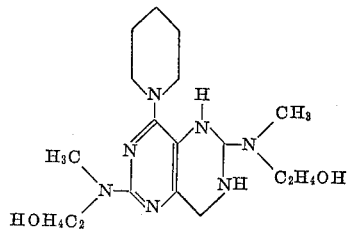

from 2,6 - di - (methylethanolamino) - 4,8 - dipiperidino-pyrimido-[5,4-d]-pyrimidine.

EXAMPLE 32

Using a procedure analogous to that described in Example 2 (b), 2,6-bis-(diethanolamino)-8-pyrrolidino-pyrimido-[5,4-d]-pyrimidine, melting point 173–175° C., was prepared by way of the intermediate 2,6-bis-(diethanolamino) - 8 - pyrrolidino - 1,2,3,4 - tetrahydro - pyrimido-[5,4-d]-pyrimidine of the formula

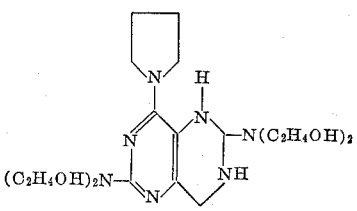

from 2,6 - bis - (diethanolamino) - 4,8 - dipyrrolidino-pyrimido-[5,4-d]-pyrimidine.

EXAMPLE 33

Using a procedure analogous to that described in Example 1, 2,6-di-(N'-methyl-piperazino)-8-piperidino-pyrimido-[5,4-d]-pyrimidine, melting point 65–70° C., was prepared by way of the intermediate 2,6-di-(N'-methyl-piperazino) - 8 - piperidino - 1,2,3,4 - tetrahydro - pyrimido-[5,4-d]-pyrimidine of the formula

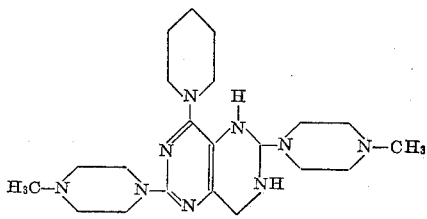

from 2,6 - di - (N' - methyl - piperazino) - 4,8 - dipiperidino-pyrimido-[5,4-d]-pyrimidine.

EXAMPLE 34

Using a procedure analogous to that described in Example 1, except that 50% acetic acid was used instead of 10% formic acid, 2,6-bis-(diethanolamino)-8-benzylamino-pyrimido-[5,4-d]-pyrimidine, melting point 153–155° C., was prepared by way of the intermediate 2,6-bis-(diethanolamino) - 8 - benzylamino - 1,2,3,4 - tetrahydro-pyrimido-[5,4-d]-pyrimidine of the formula

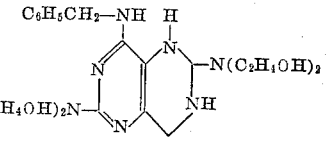

from 2,6-bis-(diethanolamino)-4,8 - di - (benzylamino)-pyrimido-[5,4-d]-pyrimidine.

EXAMPLE 35

Using a procedure analogus to that described in Example 1, 2,6-bis-(diethanolamino)-8-(4'-methyl-piperidino)-pyrimido-[5,4-d]-pyrimidine, melting point 136–138° C., was prepared by way of the intermediate 2,6-bis-(diethanolamino)-8-(4'-methyl - piperidino) - 1,2,3,4-tetrahydro-pyrimido-[5,4-d]-pyrimidine of the formula

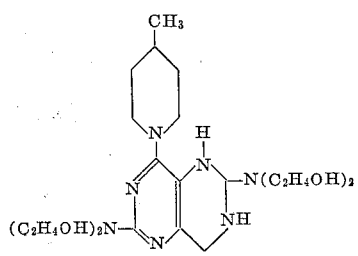

from 2,6 - bis - (diethanolamino) - 4,8 - di - (4' - methyl-piperidino-pyrimido-[5,4-d]-pyrimidine.

EXAMPLE 36

Using a procedure analogous to that described in Example 6, 2,6-diethoxy - 8 -piperidino - pyrimido - [5,4-d]-pyrimidine, melting point 87–91° C., was prepared by way of the intermediate 2,6-diethoxy-8-piperidino-1,2,3,4-tetrahydro-pyrimido-[5,4-d]-pyrimidine of the formula

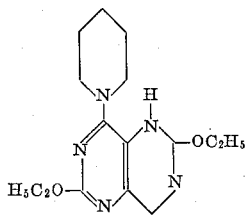

from 2,6 - diethoxy - 4,8 - dipiperidino-pyrimido-[5,4-d]-pyrimidine.

In addition to being useful as intermediates for the preparation of analogous non-hydrogenated pyrimido-[5,4-d]-pyrimidines, as illustrated above, the basic-substituted tetrahydro-pyrimido-[5,4-d]-pyrimidines embraced by Formula I above, as well as their non-toxic, pharmacologically acceptable acid addition salts, have useful pharmacodynamic properties. More particularly, they exhibit cardiovascular, spasmolytic, diuretic and central nervous system stimulating activities.

Examples of non-toxic, pharmacologically acceptable acid addition salts of the tetrahydro-pyrimido-[5,4-d]-pyrimidines according to the present invention are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like.

For pharmacological purposes, the compounds according to the present invention are administered perorally or parenterally in the form of customary dosage unit compositions consisting essentially of an inert physiologically compatible carrier and one dosage unit of one or more of the compouds of the present invention as an active ingredient, such as tablets, hypodermic solutions, suppositories, coated pills, ingestable solutions and the like. One dosage unit of the novel compounds according to the present invention is 10–250 mgm., preferably 30–120 mgm.

The following examples illustrate a few typical dosage unit compositions containing a compound of the present invention as an active ingredient. The parts are parts by weight unless otherwise specified.

EXAMPLE 37

*Tablets*

The tablet composition is compounded from the following ingredients:

| | Parts |
|---|---|
| 2,6-bis-(diethanolamino)-8 - piperidino - pyrimido [5,4-d]-pyrimidine | 50.0 |
| Lactose | 30.0 |
| Potato starch | 20.0 |
| Glycerin | 1.0 |
| Polyvinylpyrrolidone | 4.0 |
| Talcum | 4.0 |
| Magnesium stearate | 1.0 |
| Total | 110.0 |

*Compounding procedure.*—The pyrimido-pyramidine compound, the lactose, the potato starch and the polyvinylpyrrolidone are admixed with each other, the mixture is moistened with a 5% solution of the glycerin in distilled water, the moist mass is granulated by passing it through a 1 mm.-mesh screen, and the granulate is dried at 40° C. The dry granulate is admixed and blended with the talcum and magnesium stearate, and the mixture is pressed into tablets weighing 110 mgm. each. Individual tablets contain 50 mgm. of the active ingredient.

EXAMPLE 38

*Coated pills*

The tablets obtained in Example 37 are coated in well known fashion with a thin shell consisting essentially of a mixture of sugar and talcum, and the coating is then polished with beeswax.

EXAMPLE 39

*Gelatin capsules*

The contents of the capsules are compounded from the following ingredients:

| | Parts |
|---|---|
| 2,6 - bis - (diethanolamino) - 8 - piperidino-pyrimido-[5,4-]-pyrimidine | 75.0 |
| Lactose | 35.0 |
| Talcum | 10.0 |
| Total | 120.0 |

*Compounding procedure.*—The individual ingredients are admixed with each other, the mixture is milled, and the milled mass is filled in 120 mgm. portions into No. 3 gelatin capsules. Each capsule contains 75 mgm. of the active ingredient.

EXAMPLE 40

*Hypodermic solution*

The solution is compounded from the following ingredients:

| | Parts |
|---|---|
| 2,6 - bis - (diethanolamino) - 8 - piperidino-1,2,3,4 - tetrahydro - pyrimido - [5,4-d]-pyrimidine hydrochloride | 30.0 |
| Tartaric acid | 3.0 |
| Polyethyleneglycol 600 | 100.0 |
| Double-distilled water q.s.ad | [1] 2000.0 |

[1] By volume.

*Compounding procedure.*—The pyrimido-pyramidine compound and the tartaric acid are dissolved in a mixture consisting of the polyethyleneglycol and an equal volume of double-distilled water, the mixture having been heated to 70° C. Thereafter, the remaining amount of water is added and the solution is filtered until free from suspended particles. The filtered solution is filled into 2 ml. ampules in an inert gas atmosphere such as nitrogen, and the ampules are sterilized for 20 minutes at 120° C. Each ampule contains 30 mgm. of the active ingredient.

EXAMPLE 41

Ingestible solution

The solution is compounded from the following ingredients:

| | Parts |
|---|---|
| 2,6 - bis - (diethanolamino) - 8 - piperidino-1,2,3,4 - tetrahydro - pyrimido - [5,4-d]-pyrimidine hydrochloride | 50.0 |
| Tartaric acid | 5.0 |
| Cane sugar | 300.0 |
| Sorbic acid | 1.0 |
| Flavoring | 40.0 |
| Ethanol (by volume) | 200.0 |
| Polyethyleneglycol 600 (by volume) | 200.0 |
| Distilled water (by volume) q.s.ad | 1000.0 |

*Compounding procedure.*—The sorbic acid is dissolved in the ethanol, an equal amount by volume of water is added thereto, and the pyrimido-pyrimidine compound and the tartaric acid are dissolved therein while stirring (Solution I). The cane sugar is dissolved in the remaining amount of water (Solution II). Solution II, the polyethyleneglycol and the flavoring are stirred into Solution I, and the finished solution is filtered. 1 cc. of the finished solution contains 50 mgm. of the active ingredient.

EXAMPLE 42

Tablets

The tablet composition is compounded from the following ingredients:

| | Parts |
|---|---|
| 2,6 - bis - (diethanolamino) - 8 - piperidino-1,2,3,4 - tetrahydro - pyrimido - [5,4-d] - pyrimidine hydrochloride | 80.0 |
| Potato starch | 36.0 |
| Gelatin | 3.0 |
| Magnesium stearate | 1.0 |
| Total | 120.0 |

*Compounding procedure.*—The pyrimido-pyrimidine compound and the potato starch are thoroughly admixed with each other, the mixture is moistened with an aqueous 10% solution of the gelatin, the moistened mass is granulated by passing it through a 1 mm.-mesh screen, and the granulate is dried at 40° C. The dry granulate is again passed through the 1 mm.-mesh screen, admixed with the magnesium stearate, and the mixture is pressed into 120 mgm. tablets. Each tablet contains 80 mgm. of the active ingredient.

EXAMPLE 43

Coated tablets

The tablets obtained in Example 42 are coated with a thin shell consisting essentially of sugar and talcum. The coating is then polished with beeswax.

EXAMPLE 44

Suppositories

The suppository composition is compounded from the following ingredients:

| | Parts |
|---|---|
| 2,6 - dimorpholino - 8 - methyl - ethanolamino-pyrimido-[5,4-d]-pyrimidine | 120.0 |
| Cocoa butter | 1580.0 |
| Total | 1700.0 |

*Compounding procedure.*—The cocoa butter is melted and then cooled to 37° C. The finely powdered pyrimido-pyrimidine compound is stirred into the cocoa butter, the mixture is homogenized and is then formed into cooled suppository molds holding 1700 mgm. of the mixture. Each suppository contains 120 mgm. of the active ingredient.

While the present invention has been illustrated with the aid of certain specific embodiments, it will be readily apparent to others skilled in the art that the invention is not limited to these embodiments and that various changes and modifications may be made without departing from the spirit of the invention or the scope of the appended claims.

We claim:

1. A compound selected from the group consisting of basic substituted 1,2,3,4-tetrahydro-pyrimido-[5,4-d]-pyrimidines of the formula

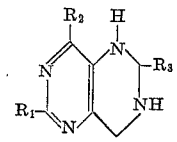

wherein $R_1$ and $R_3$ are each selected from the group consisting of hydrogen, halogen, lower alkoxy, lower alkoxy-lower alkoxy and basic groupings selected from the group consisting of amino, mono-lower alkyl-amino, di-lower alkyl-amino, lower alkenyl-amino, anilino, lower alkyl-hydroxy lower alkyl-amino, mono-(hydroxy lower alkyl)-amino, di-(hydroxy lower alkyl)-amino, benzylamino, morpholino, piperidino, 4-lower alkyl-piperidino, tetrahydropyridino, pyrrolidino and N'-lower alkyl-piperazino, and $R_2$ is selected from the group consisting of lower alkoxy, lower alkoxy-lower alkoxy and basic groupings selected from the group consisting of amino, mono-lower alkyl-amino, di-lower alkyl-amino, lower alkenyl-amino, anilino, lower alkyl-hydroxy lower alkyl-amino, mono-(hydroxy lower alkyl)-amino, di-(hydroxy lower alkyl)-amino, benzylamino, morpholino, piperidino, 4-lower alkyl-piperidino, tetrahydropyridino, pyrrolidino and N'-lower alkyl-piperazino, and provided that at least one of $R_1$, $R_2$ and $R_3$ is one of said basic groupings, and that only one of $R_1$ and $R_3$ may be halogen, and their non-toxic, pharmocologically acceptable acid addition salts.

2. 2,6 - bis - (diethanolamino) - 8 - piperidino - 1,2,3,4-tetrahydro-pyrimido-[5,4-d]-pyrimidine.

3. 2 - diethanolamino - 6 - chloro - 8 - piperidino-1,2,3,4-tetrahydro-pyrimido-[5,4-d]-pyrimidine.

4. 2,6,8 - tripiperidino - 1,2,3,4 - tetrahydro - pyrimido-[5,4-d]-pyrimidine.

5. 2,6,8 - trimorpholino - 1,2,3,4 - tetrahydro-pyrimido-[5,4-d]-pyrimidine.

6. 2,6,8 - triamino - 1,2,3,4 - tetrahydro - pyrimido-[5,4-d]-pyrimidine.

7. 2,6,8 - tri - (methylamino) - 1,2,3,4 - tetrahydro-pyrimido-[5,4-d]-pyrimidine.

8. 2,6 - bis - (diisopropanolamino) - 8 - morpholino-1,2,3,4-tetrahydro-pyrimido-[5,4-d]-pyrimidine.

References Cited

FOREIGN PATENTS 635,100  1/1962  Canada.

ALEX MAZEL, *Primary Examiner.*

MARY U. O'BRIEN, *Assistant Examiner.*